United States Patent
Johansson et al.

(10) Patent No.: US 7,421,964 B2
(45) Date of Patent: Sep. 9, 2008

(54) FLOATING STRUCTURE IN THE SHAPE OF A CONCRETE COFFERDAM AND A METHOD FOR MOULDING THE CONCRETE COFFERDAM

(75) Inventors: Arne Johansson, Västerhaninge (SE); Richard Bergström, Stockholm (SE)

(73) Assignee: Aquavilla AB, Solna (SE)

( * ) Notice: Subject to any disclaimer, the term of this patent is extended or adjusted under 35 U.S.C. 154(b) by 0 days.

(21) Appl. No.: 10/599,430

(22) PCT Filed: Apr. 1, 2005

(86) PCT No.: PCT/SE2005/000485

§ 371 (c)(1),
(2), (4) Date: Jul. 2, 2007

(87) PCT Pub. No.: WO2005/095199

PCT Pub. Date: Oct. 13, 2005

(65) Prior Publication Data

US 2007/0280784 A1 Dec. 6, 2007

(30) Foreign Application Priority Data

Apr. 2, 2004 (SE) .................................. 0400898

(51) Int. Cl.
*B63B 5/14* (2006.01)
*F25B 29/00* (2006.01)

(52) U.S. Cl. ........................ 114/65 A; 114/264; 165/66; 405/11

(58) Field of Classification Search ............... 114/65 A, 114/264, 267; 425/61; 165/56; 249/15; 405/222, 223

See application file for complete search history.

(56) References Cited

U.S. PATENT DOCUMENTS

| 1,345,013 | A | * | 6/1920 | Gustavus | 425/61 |
|---|---|---|---|---|---|
| 1,356,064 | A | * | 10/1920 | Guerini | 425/61 |
| 3,749,162 | A | * | 7/1973 | Anders | 166/354 |
| 3,765,354 | A | * | 10/1973 | Gronroos | 114/312 |
| 3,884,444 | A | * | 5/1975 | Dashew | 249/112 |
| 4,548,453 | A | * | 10/1985 | Mummey et al. | 439/55 |
| 4,565,149 | A | * | 1/1986 | Clasky et al. | 114/264 |
| 4,663,897 | A | | 5/1987 | Ridett | |
| 5,848,536 | A | * | 12/1998 | Dodge et al. | 62/240 |

FOREIGN PATENT DOCUMENTS

DE 3017183 11/1981

* cited by examiner

*Primary Examiner*—Sherman Basinger
(74) *Attorney, Agent, or Firm*—Renner, Otto, Boisselle & Sklar, LLP.

(57) ABSTRACT

The present invention relates to a floating structure comprising at least a closed space (10), a hull in the shape of a concrete cofferdam (12) having an external delimiting surface intended to be exposed to surrounding water, and a function for heating of the space comprising a heat pump connected to a closed circuit for circulating heat transport medium. At least one collector hose (14) for the circulating heat transport medium is provided in recesses in the concrete such that the cross section of the collector hose is located entirely within an outer outline of the cofferdam, whereby heat from surrounding water is absorbed by the collector hose and used for heating of the space. The invention also relates to a method of moulding a concrete cofferdam (12) adapted to be a hull of a floating structure.

10 Claims, 3 Drawing Sheets

FLOATING STRUCTURE IN THE SHAPE OF A CONCRETE COFFERDAM AND A METHOD FOR MOULDING THE CONCRETE COFFERDAM

This application is a national phase of International Application No. PCI/SE2005/000485 filed Apr. 1, 2005 and published in the English language.

TECHNICAL FIELD

This invention relates to a floating structure comprising a closed space, primarily a home that is heated by a heat pump, where the collector of the heat pump is adapted to transfer heat from ambient water to the heat pump.

BACKGROUND

The construction of homes in a marine environment has become an increasingly interesting issue in recent years. By constructing floating homes, unused quays and beach lines can be utilised without the need for extensive exploitation of sensitive environments and with flexibility as to amended detail plans. In a flexible way such homes can also provide quick solutions to housing shortage. A prerequisite for a functional living on a floating structure is, however, that the same high standards as to comfort, living environment and an environmental considerations have to be met on such a home as on a conventional home on solid ground.

The heating of a floating home may be accomplished for example by an oil boiler, electric boiler, by connection to distant heating or by means of a heat pump utilising the heat of ambient water for heating. In conventional use of a sea water heat pump, collector hoses having a circulating heat transporting medium are placed on a lake bottom or a sea bottom. For a floating home that uses a heat pump for heating, it is, however, not appropriate to provide collector hoses on the bottom in connection to the home, as the hoses will there be in danger of being subjected to external damage from, for example, anchoring, dredging, navigation etc. Moreover, the flexibility as to the mobility of the floating home would be deteriorated by the dependence of a stationary arrangement outside of the floating structure.

It is previously known to heat a floating home by arranging collector hoses on a heat pump outside the hull of the floating structure in contact with ambient water, thereby to at least partially solve the above mentioned problem. The hoses are, however, still exposed to external damage and may be subjected to damage if, for example grounding and collisions between floating structures should occur. If there is a need for lifting the floating structure, the location of the hoses will make it more difficult to attach lifting straps around the hull, as well as the possibility of placing the structure in a dry dock without damaging the hoses.

Accordingly there is a need to improve the prior art relating to the heating of floating structures by means of a heat pump.

DISCLOSURE OF THE INVENTION

An object of the present invention is therefore to solve at least some of the problems related to the prior art. More specifically the invention is concerned with a floating structure, comprising at least one closed space, a hull in the shape of a concrete cofferdam having an external delimiting surface intended to be exposed for surrounding water, and a function for heating the space comprising a heat pump connected to a closed circuit for a circulating heat transport medium. At least one collector hose for circulating the heat transport medium is arranged in cavities in the concrete in such a way that the section of the collector hose is located entirely interiorly of an outer outline of the cofferdam, whereby heat from surrounding water is received by the collector hose and utilised for heating the space. In this context, outline has the meaning of an imagined delimiting surface similar to a film stretched over the limiting surface of the cofferdam. In the case the external delimiting surface of the cofferdam is substantially smooth, the external outline accordingly coincides with the actual outer delimiting surface, while in the case the outer delimiting surface has a structure, the outer outline will partially lie on the outside of the true outer delimiting surface and "cover" depressions in the surface of the cofferdam.

By providing the collector hose interiorly of the outer outline of the cofferdam, the hoses are protected against external mechanical damage. The structure can also be lifted by lifting straps arranged below the hull, without the lifting straps contacting the collector hose. It is also possible to locate the structure on a solid bed without affecting the collector hose since then the structure will rest on its exterior outline.

According to a preferred embodiment of the invention, the collector hose is provided in elongate depressions in the surface of the concrete cofferdam in such a way that the cross section of the collector hose, at least in part is exposed to the surrounding water while the remaining part of the cross section is moulded into the concrete. According to another preferred embodiment, the collector hose is arranged in elongate depressions in the surface of the concrete cofferdam in such a way that the cross section of the collector hose is fully exposed to the surrounding water without any moulded-in portion.

According to a preferred embodiment, the outer delimiting surface of the concrete cofferdam has trapezoidal depressions and ridges, whereby the collector hose is arranged in the depressions. The tops of the ridges will then be the exterior outline of the outer delimiting surface of the concrete cofferdam, whereby no portion of the cross section of the collector hose is allowed to be outside of this outline. For example when the structure is lifted, lifting straps are provided across the direction of the trapezoidal depressions so that the lifting straps will be supported against the ridges of the trapezoidal shape while the collector hose in the depressions is being unaffected. According to an alternative embodiment, the outer delimiting surface of the concrete cofferdam has sinusoidal depressions and ridges having the same function as described above.

In accordance with a further embodiment of the invention, the collector hose is provided in closed recesses entirely enclosed by concrete, whereby heat of the surrounding water is transferred to the collector hose via heat conduction in the concrete. When the collector hose in this way is entirely cast our moulded into the concrete cofferdam, no part of the cross section of the collector hose is exposed to surrounding water, which reduces its heat absorption ability compared to when the collector hose is entirely or partly exposed to the water. This embodiment has, however, advantages as to fabrication by having, to a certain extent, a simplified process of fabrication) as the external delimiting surface may be planar. In addition, the bigger the portion of the collector hose that is moulded-in the better it is protected against external damage. An alternative embodiment is to provide the collector hose entirely moulded-in at the interior side of an exterior delimiting surface that has elongate depressions and ridges, where a collector hose is provided moulded into the concrete, inside the depression. In this way the covering concrete layer may be thin, to improve the heat absorption of the collector hose at the same time as the ridges provide for resistance to external influences and loads, as described above.

According to a preferred embodiment the collector hose is provided in the bottom section of the concrete cofferdam. If necessary, the collector hose can also be arranged in the walls of the concrete cofferdam. This is the case primarily when the collector hose is entirely moulded into the cofferdam, and, due reduced heat absorption, there is a need to increase the length of the collector hose and the area above which the collector hose is provided.

According to a particularly preferred embodiment of the invention a bypass is provided in the closed circuit, which bypass directs a certain amount of the circulating heat transfer medium to a separate circulation loop located upstream of the heat pump. This circulation loop directs the circulating heat transfer medium through a convecting device, whereby the circulating medium also is used for cooling the space. Hereby it is possible to heat, for example, the shadowed side of the space, at the same time as another portion of the space is needed to be cooled due to solar radiation. By heat exchange in the convecting device also further heat is supplied from the heated space to the amount of circulating medium that passes the convecting device, whereby in this way the cooling function increases the amount of heat in the circulation medium that can be utilised in the heat pump.

In accordance with a preferred embodiment of the invention, the closed space is a home. Another possible area of application may for example be a storage space for goods requiring a certain temperature.

The present invention also relates to a method for casting a concrete cofferdam intended to be a hull of a floating structure, comprising: casting the concrete cofferdam in an at lest partly profiled mould in such a way that the concrete cofferdam obtains an external delimiting surface having a structure. In accordance with a preferred embodiment of the invention the concrete cofferdam is cast onto a corrugated metal sheet having trapezoidal depressions. In accordance with an alternative embodiment the concrete cofferdam is cast onto a sinusoidal metal sheet.

BRIEF DESCRIPTION OF DRAWINGS

Exemplary embodiments of the invention is described in the following with reference to the enclosed drawings, where.

DESCRIPTION OF EXEMPLARY EMBODIMENTS

Figure 1:
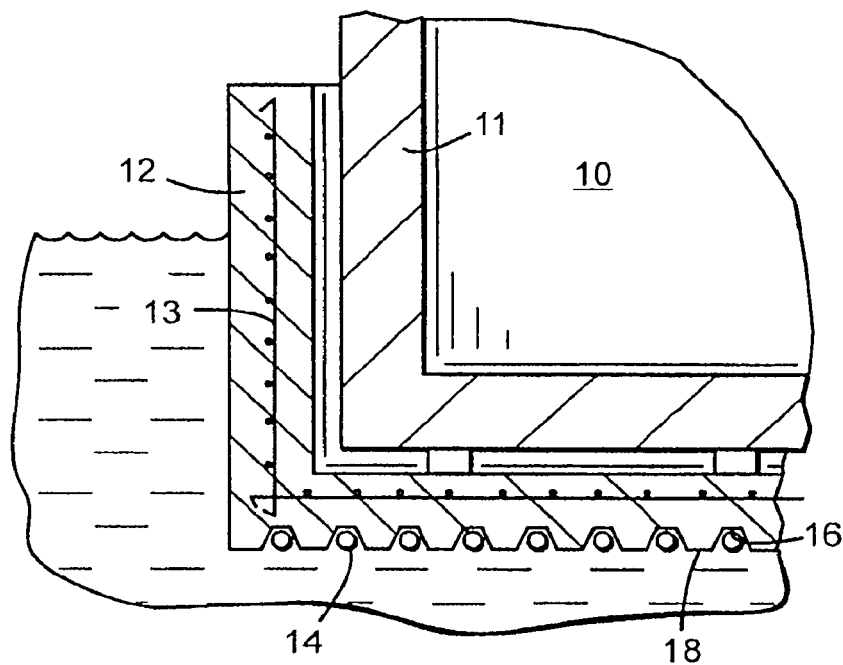
FIG. 1 shows a section of a floating structure according to the invention.

FIG. 1 shows a section of floating structure according to the invention. A basic structure 11 for a closed space 10 is provided in a hull in the shape of a reinforced concrete cofferdam 12 shown in section in FIG. 1. The reinforcement 13 is shown diagrammatically in FIG. 1. The basic structure 11 is placed in the cofferdam on pedestals, plinths or the likes such that an air gap is formed between the interior surface and the cofferdam and the basic structure 11. Installations for water, effluents etc. may be located in the air gap. A collector for a heat pump is provided in the bottom of the concrete cofferdam and comprising one or more loops of collector hoses 14 placed in recesses in the concrete. Through the collector a heat transport medium is circulated in a closed cycle absorbing heat from surrounding water and transporting heat to the heat pump which in a known manner extracts the heat from the water to heat the space 10. The circulating heat transport medium suitably consists of water by an addition of alcohol to prevent freezing. The heat pump (not shown) is located within the closed space 10. The connection between the collector and the heat pump is laid through the walls of the concrete cofferdam above the imagined water level, whereby through-connections in the concrete cofferdam below the water level may be avoided with the intention to keep the cofferdam watertight.

Figures 7A, 7B, 7C:
FIG. 7 a-c show examples of profiles of a mould for moulding the concrete cofferdam.

According to the embodiment shown in FIG. 1, the bottom of the cofferdam is "fluted" in such a manner that the external delimiting surface of the bottom of the cofferdam has a trapezoidal shape with depressions 16 directed to the interior of the cofferdam and ridges 18 directed outwards from the cofferdam. A surface coincident with the crests of the ridges forms an external outline of the cofferdam. The depth of the depressions 16 is at least as large as, alternatively larger than, the external diameter of the collector hose 14, whereby the entire cross section of the collector hose is located inside the external outline of the cofferdam. In accordance with the embodiment shown in FIG. 1, the collector hose is accordingly entirely exposed to the surrounding water, resulting in a good heat transmission from the water to the circulating heat transporting medium. This trapezoidal shaped delimiting surface of the bottom of the cofferdam is provided by a floated surface if needed the cofferdam is moulded onto a corrugated metal sheet having a trapezoidal shape, see FIG. 7a. Of course, other shapes of the external delimiting surface are possible. The delimiting surface may, for example, be given a sinusoidal shape having the same function as described above. This is obtained by moulding against a sinusoidal shaped metal sheet, see FIG. 7c.

Figure 2:
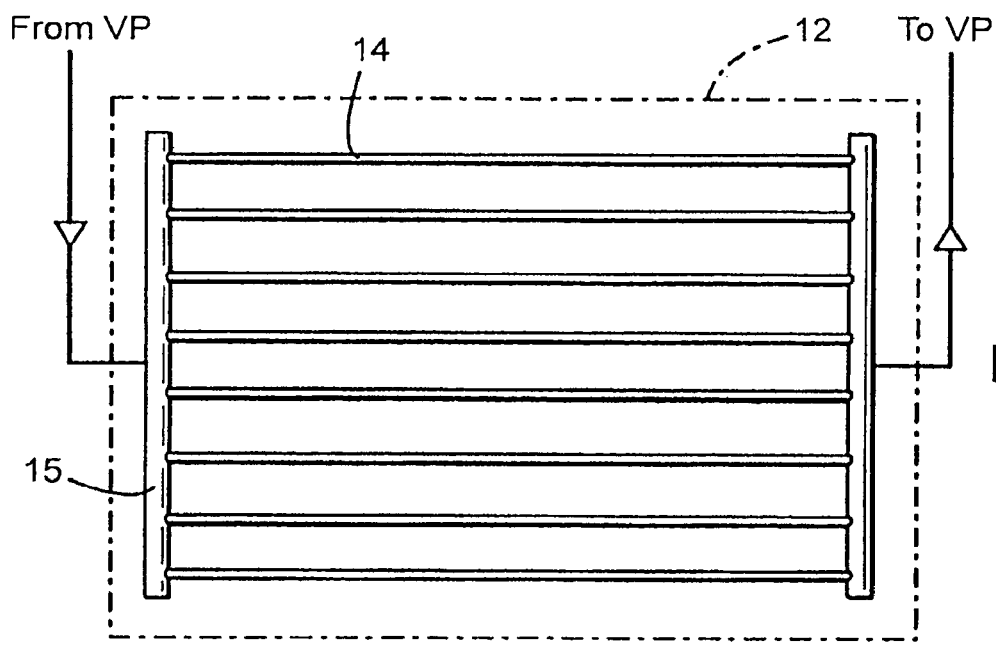
FIG. 2 shows an example of a collector to a heat pump.

The collector can consist of one or more collector hoses provided in one or more loops depending on actual circumstances and heating needs. FIG. 2 shows an example of a collector where collector hoses 14 are provided in parallel loops between transverse primary pipes 15. According to the above described embodiment, the primary pipes may be provided moulded into the concrete while the collector hoses are exposed to the surrounding water.

Figure 3:
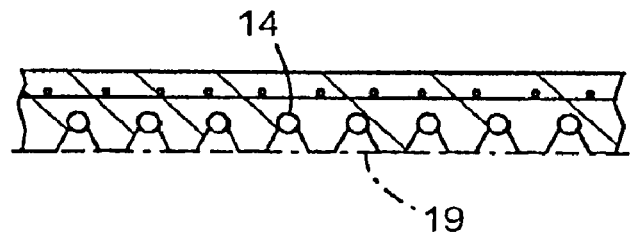
FIG. 3 shows a second embodiment of the invention.

FIG. 3 shows an alternative embodiment where the external delimiting surface of the bottom of the cofferdam has a trapezoidal shape and where the cross section of the collector hose is partially moulded into the concrete, whereby only a smaller portion of the cross section of the collector hose in this case is exposed to the water. In FIG. 3, the imagined outer outline 19 is shown in phantom. When manufacturing a concrete cofferdam according to this second embodiment, the cofferdam is moulded onto a corrugated metal sheet as described above, whereby every ridge of the corrugated sheet has a concave surface, see FIG. 7b, into which the collector hose is placed before moulding.

Figure 4:
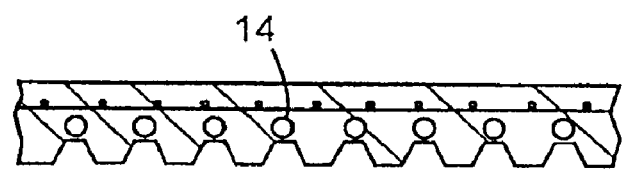
FIG. 4 shows a third embodiment of the invention.

FIG. 4 shows a third possible embodiment of the invention where the outer delimiting surface of the bottom of the cofferdam has a trapezoidal shape as previously but in this case the collector hoses 14 are entirely moulded into the concrete inside the respective depression with a thin covering concrete layer between the water and the collector hoses. The covering concrete layer in the depressions may be kept thin, as the ridges, like in the previous embodiments, absorb external mechanical influence on the hull, but should, however, not be so thin that there is a risk of bad filling of the concrete at the moulding operation. If this should be the case, there exists a danger of a leaky structure resulting in a corrosive attack on the reinforcement.

Figure 5:
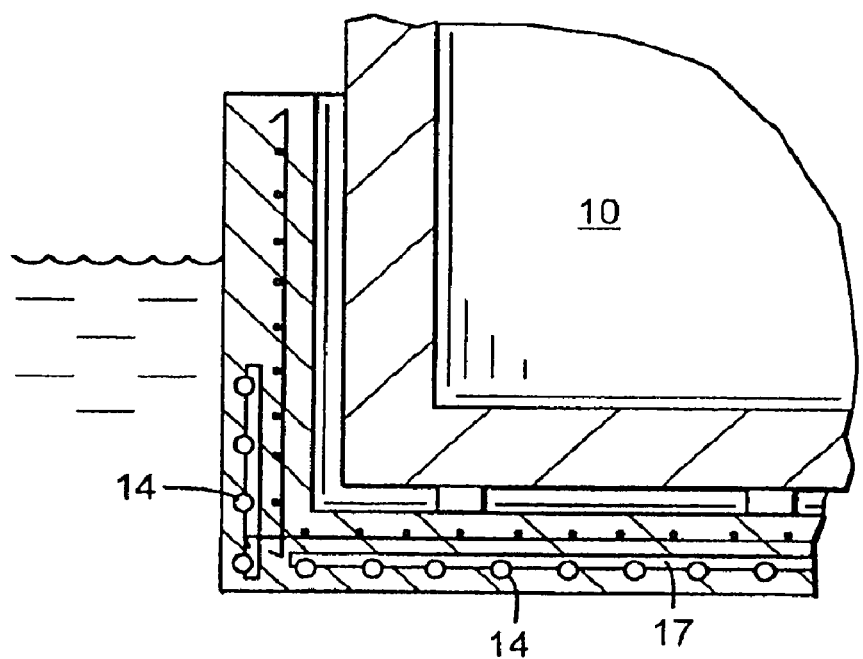
FIG. 5 shows a fourth embodiment of the invention.

FIG. 5 shows a forth possible embodiment of the invention where the external delimiting surface of the bottom of the cofferdam is planar and where the collector hoses are entirely moulded-in at the inside of a larger covering concrete layer. The heat transfer between water and collector hose in this case is substantially lower than that for the previous embodiments since heat has to be transferred through a relatively thick layer of concrete. As a result more collector hose is required to be provided over a larger surface than that in the previous embodiments in order to compensate for the reduced heat transfer. In certain cases the bottom of the cofferdam does not provide a sufficiently large area over which to provide the collector hoses, whereby the collector hoses may be provided also in the portion of the walls of the cofferdam that are intended to lie below the water level, within planes parallel to the walls of the cofferdam as shown in FIG. 5. Despite the reduced heat absorption, this embodiment has certain manufacturing advantages by using a manufacturing process simplified to a certain extent, since the outer delimiting surface of the concrete cofferdam is planar. In addition, the collector in this case is fully protected against external damage and is also free of maintenance.

Of course, combinations of the embodiments described above are possible.

In the cases where the collector is entirely moulded into the concrete, the hoses are provided in parallel loops by virtue of a centering rail 17 of plastics material to assist in the positioning of the hoses during moulding.

Applicable to all of the embodiments described above is that the more of the cross section of the collector hose that is exposed to the surrounding water, the less hose and surface area is consumed to meet the requirement of heat for heating the closed space. Conversely applicable is that the bigger the portion of a cross section of the collector hose that is moulded into the concrete, the better protected is the hose against external damage, particularly from pointed objects.

Figure 6:
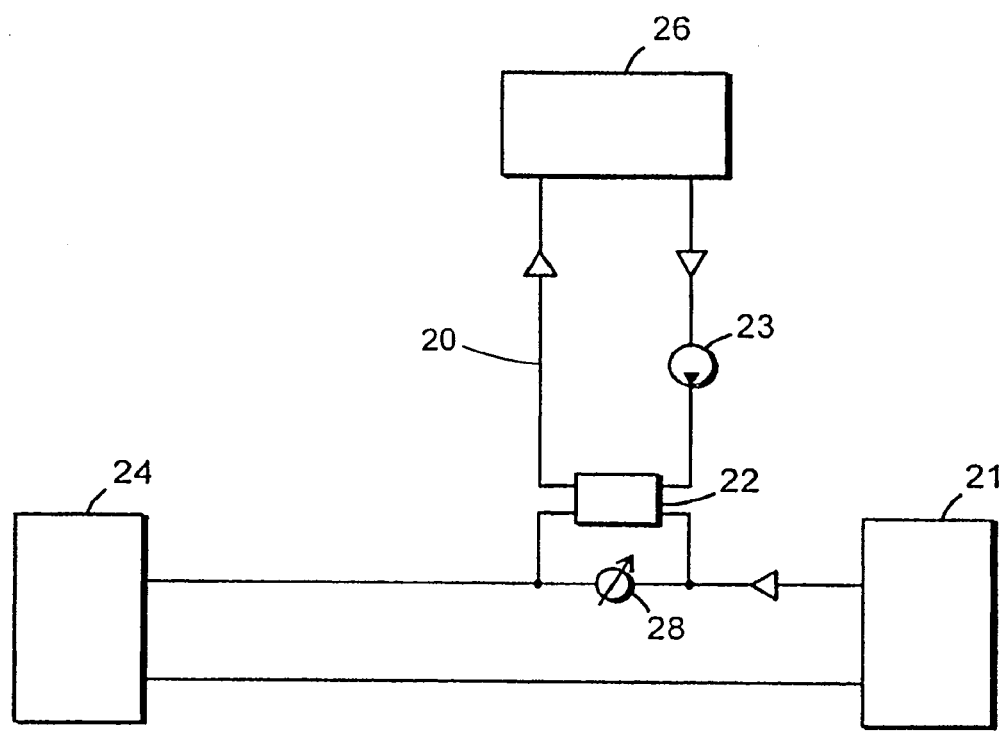
FIG. 6 diagrammatically shows a cooling function for the closed space.

According to a specifically advantageous embodiment of the invention, the circulating heat transfer medium is also used for cooling of the closed space, by dividing a certain amount of the medium to a separate loop 20 connected to the circuit from the collector 21 via a bypass 22, as shown diagrammatically in FIG 6. The collector 21, shown here only diagrammatically, may for example have the shape shown in FIG 2. The bypass 22 is placed upstream of the heat pump 24, i.e. before the heat transport medium has reached the heat pump. The divided amount of heat transport medium is passed by a circulating pump 23 through a convecting device 26 where heat exchange takes place with the heated air in the closed space 10. As the air in the space usually has a higher temperature than the heat transport medium, which has substantially the same temperature as the surrounding water, the relative coldness in the medium is utilised to cool closed space 10. By the heat exchange taking place in the convecting device 26, heat from the heated space is accordingly supplied to the amount of circulating medium that has passed the convector, whereby the cooling function in this way increases the amount of heat in the circulating medium that can be extracted in the heat pump. The cooling function can be flow controlled by use of a throttle valve 28 in the closed circuit and the temperature control takes place by a thermostat in the convector that varies the fan velocity therein in a manner known per se. To further extract the heat of the heated air, a heat battery may be arranged in parallel to the convector, whereby the circulating medium passes through the heat battery, in an exhaust air duct of the ventilation system of the closed space, whereby more heat is supplied to the circulating medium to be extracted by the heat pump 24.

Accordingly, the heating and cooling function is used in parallel, whereby, for example, the shadowed side of the space 10 may be heated, at the same time as solar radiation in another part of the space creates the need for cooling. When the closed space is used as a home, which is the primarily application of the invention, the space is of course divided in a plurality of rooms, including wet rooms etc. having different needs of heating and cooling, respectively.

The expression "collector hose" has been used throughout this description, where hose refers to a flexible line, suitably a polyethylene hose. It is understood, however, that the collector may as well comprise arbitrary types of lines, for example non-flexible pipes.

The invention is not to be seen as limited to the embodiments described above. A skilled person will find further embodiments and applications within the scope of the invention as defined in the appended claims.

The invention claimed is:

1. A floating structure comprising at least one closed space, a hull in the shape of a concrete cofferdam having an external delimiting surface to be exposed to surrounding water, and a function for heating the space comprising a heat pump connected to a closed circuit for a circulating heat transport medium, wherein at least one collector hose for the circulating heat transport medium is provided in recesses in the concrete such that a cross section of the collector hose is in its entirety located within an external outline of the cofferdam, heat from the surrounding water being absorbed by the collector hose and extracted for heating of the space.

2. The floating structure according to claim 1, wherein the collector hose is provided in elongate depressions in the external delimiting surface of the concrete cofferdam such that the cross section of the collector hose at least partially is exposed to the surrounding water.

3. The floating structure according to claim 1, wherein the collector hose is provided in elongate depressions in the external surface of the concrete cofferdam such that the cross section of the collector hose is entirely exposed to the surrounding water.

4. The floating structure according to claim 1, wherein the collector hose is arranged in closed recesses where the entire cross section of the hose is surrounded by concrete, whereby heat of the surrounding water is transferred to the collector hose by heat conduction in the concrete.

5. The floating structure according to claim 1, wherein the external delimiting surface of the concrete cofferdam comprises trapezoidal depressions and ridges.

6. The floating structure according to claim 1 wherein the external delimiting surface of the concrete cofferdam is planar.

7. The floating structure according to claim 1, wherein the collector hose is provided in a bottom section of the concrete cofferdam.

8. The floating structure according to claim 1, wherein the collector hose is provided in the walls of the concrete cofferdam.

9. The floating structure according to claim 1, wherein a bypass is provided in the closed circuit, the bypass being capable of dividing a certain amount of the circulating heat transport medium to a separate circulation loop located upstream of the heat pump, that said separate circulation loop passes the circulating heat transport medium through a convecting device whereby the circulating medium also is used for cooling of the space.

10. The floating structure according to claim 1, wherein the closed space is a home.

\* \* \* \* \*